Feb. 16, 1937.   R. O. WHITE   2,071,188
CIRCULATING LIQUID COOLER
Filed Feb. 12, 1935    3 Sheets-Sheet 1

Inventor
Robert O. White
By James M. Abbott
Attorney

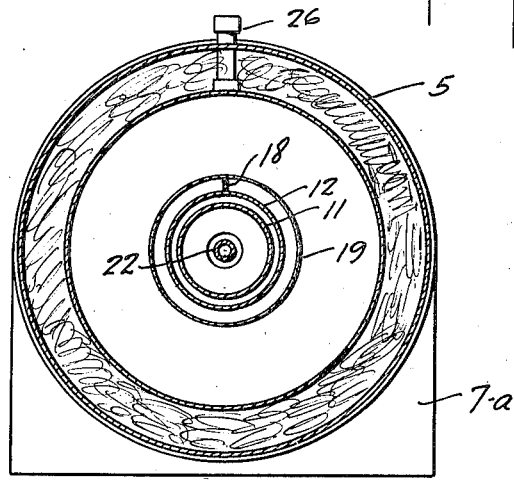
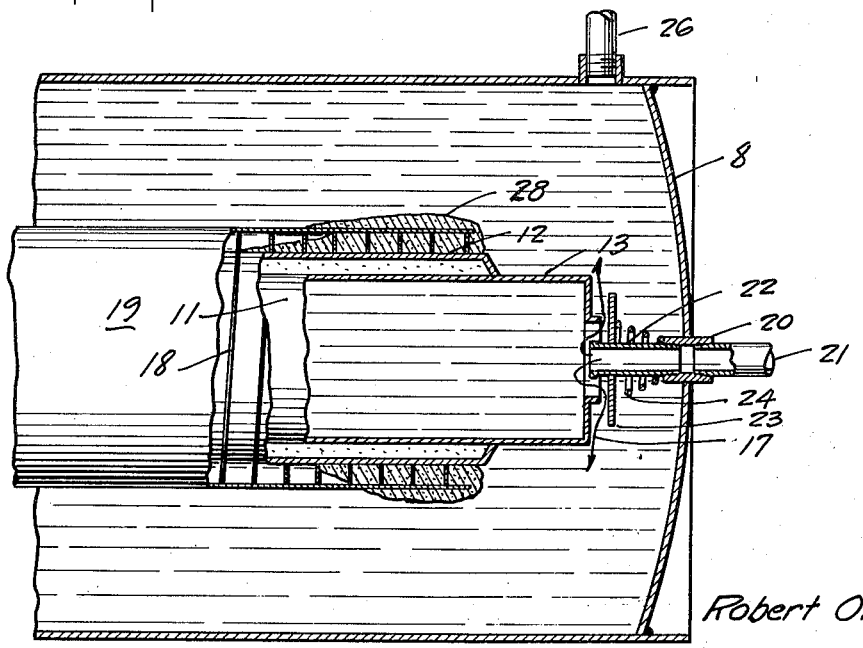

Feb. 16, 1937.   R. O. WHITE   2,071,188
CIRCULATING LIQUID COOLER
Filed Feb. 12, 1935    3 Sheets-Sheet 3

Inventor
Robert O. White
By James M. Abbott
Attorney

Patented Feb. 16, 1937

2,071,188

UNITED STATES PATENT OFFICE 2,071,188

CIRCULATING LIQUID COOLER

Robert O. White, Manhattan Beach, Calif.

Application February 12, 1935, Serial No. 6,162

21 Claims. (Cl. 62—141)

This invention relates to a cooler for liquids circulated therethrough. The invention has a specific field of use in cooling of water for beverage purposes wherein the cooler is connected to a house service system and water is withdrawn at a tap being cooled in its travel. However, it will be understood that the invention has much wider application. In domestic cooling of water wherein there is erratic withdrawal of quantities of water for consumption, either a cooler of large refrigerating capacity is required to take care of intermittent withdrawal of large volumes, or an accumulation of a large volume of cooled water to take care of such overloads. Obviously a large capacity refrigerating unit is not as efficient for the average water consumption, is not compact and not of the best efficiency. By use of an accumulator high efficiency, less cost and more compactness of the refrigerating unit may be obtained.

My invention contemplates a compact cooler having a storage tank for cooled water, compactly built and efficient. More specifically the invention has for its primary object the provision of a storage tank having housed therein a cooling and circulating unit wherein the incoming liquid of high temperature is separated from the outgoing liquid and having any or all of the following features: A chamber for liquid to be cooled with a tortuous way for liquid disposed about said chamber; a refrigerant chamber of annular form, the inner bore of the chamber forming a chamber for liquid to be cooled and a tortuous way about said chamber, the liquid passing through the inner bore on the way from inlet to outlet; a cooler of the character described having a bypass valve, automatically operable in the event of the way clogging, to deliver liquid from the inlet directly to the storage compartment; a unit in which the bypass valve is located to hinder its freezing in seated position; and details of structure contributing to simplicity and compactness of structure, certainty of operation and a high degree of efficiency.

These objects are accomplished by means of the embodiment of my invention illustrated in the accompanying drawings, in which:—

Fig. 3 is a section as seen on the plane indicated by 3—3 in Fig. 1.

Fig. 4 is a sectional view through a fragment of the cooler on an enlarged scale showing the bypass valve.

Figure 1:
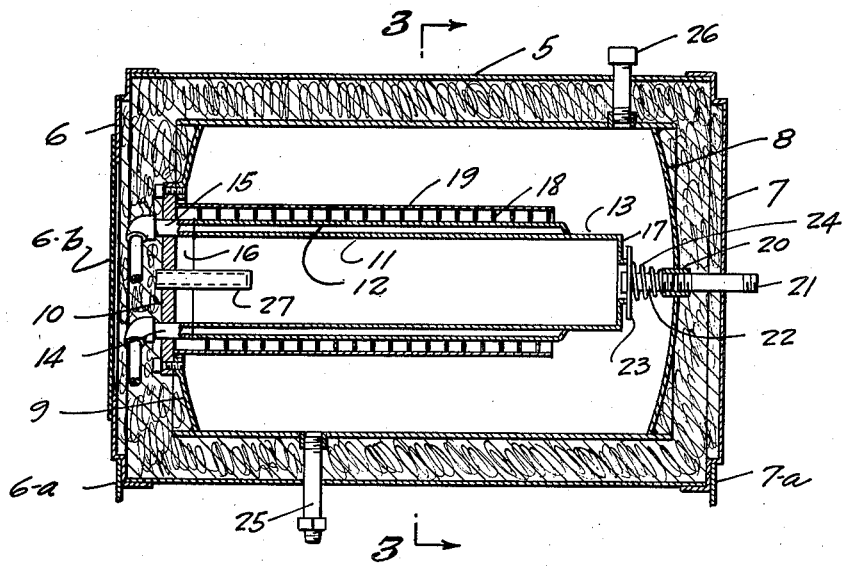
Fig. 1 is a vertical sectional view taken through the cooler.
Figure 2:
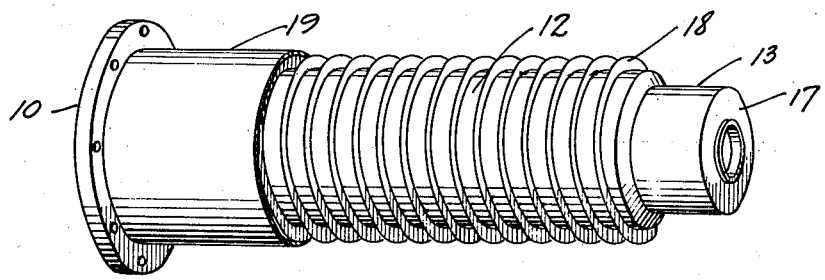
Fig. 2 is a perspective view of the refrigerating unit with a portion of the sleeve broken away to show the spiral channel.

Referring more particularly to the drawings, an insulated pressure storage tank is denoted by 5. This tank has heads 6 and 7 and is adapted to have end plates 6a and 7a for mounting the cooler horizontally or vertically on a base. The head 6 has an opening covered by a detachable cover plate 6b to give access to the cooling unit. The inner shell of the tank is closed by a head 8. The other end has a head 9 with an opening adapted to receive a closure plate 10 upon which the refrigerating and circulating unit is mounted. The unit comprises an annular refrigerant evaporating chamber formed between tubular shells 11 and 12 disposed in spaced relation and closed at the ends. The inner shell 11 projects beyond the shell 12 as indicated by 13. Tubular pipes 14 and 15 extend through the plate 10 and serve as ducts for connection to an inlet for refrigerant and to a suction line respectively of a refrigerating machine. It will be noted that the shells 11 and 12 are spaced from the plate 10 to provide for communcation of the bore of the inner shell with the exterior of the refrigerant chamber through passageway 16. A ported head 17 closes the opposite end of the bore of shell 11.

A spiral fin 18 circumscribes the shell 12. Mounted over the fin so as to close the channels formed thereabout is a tubular sleeve 19. Sleeve 19 is joined at one end to the plate 10 and open at its other end. A spiral or tortuous way is thus formed around the shell 12 and therealong communicating with the bore of shell 11 at one end through passageway 16 and with the storage compartment of tank 5 at the other end.

Connected to a hollow boss 20 extending through head 8 is a pipe 21 adapted to be connected to the source of supply for liquid such for example as with the domestic water supply system. A tubular valve guide 22 is connected to the boss 20 and extends into the port of head 17 forming a continuation of pipe 21. Slidably mounted on the valve guide 22 is a valve disk 23 for closing a port in head 17. A compression spring 24 tends to hold the valve disk on its seat closing the port in head 17.

The connection 14 may be placed in communication by a pipe with a refrigerant valve and the suction line connection 15 may be connected by a pipe to the suction line of a refrigerating machine. A cold water outlet indicated by 25 is connected to tank 5 and an air purging connection is marked 26.

In the operation of the device as shown in Figs. 1 to 4, inclusive, water from a city water supply enters the inlet 21 and passes into the bore of shell 11. From the bore water passes through passageway 16 and then along the spiral way formed by fin 18, shell 12, and sleeve 19 to the storage compartment of tank 5. From the storage compartment, water may be withdrawn through the outlet 25. The water follows a long path in contact with the walls of the refrigerating chamber. It first enters the coldest portion, that is, the bore of the shell and it is maintained separate from the water in the storage compartment until it finally emerges from the spiral way. In the event that ice should form so as to clog the path of travel of the liquid, as shown in Fig. 4, the water pressure will lift valve disk 23 and allow water from the inlet to pass directly into the storage compartment of tank 5. This water will be cooled by the ice mass 28 and the latter will be gradually melted, opening up the spiral way and causing the cooler to function normally. The bypass valve only opens on formation of ice and this mass of ice adds to cooling of water which may pass directly into the storage compartment. The projection of shell 11 as indicated at 13 in the drawings positions the valve and ported head 17 at such distance from the refrigerating chamber that ice will not form at this point and freeze the valve on its seat.

The refrigerating machine may be thermostatically controlled by the temperature of the incoming water. I have shown herein a thermal tube or well 27 extending through plate 10 and adapted to house a bulb which may operate a motor switch controlling the refrigerating machine.

Figure 5:
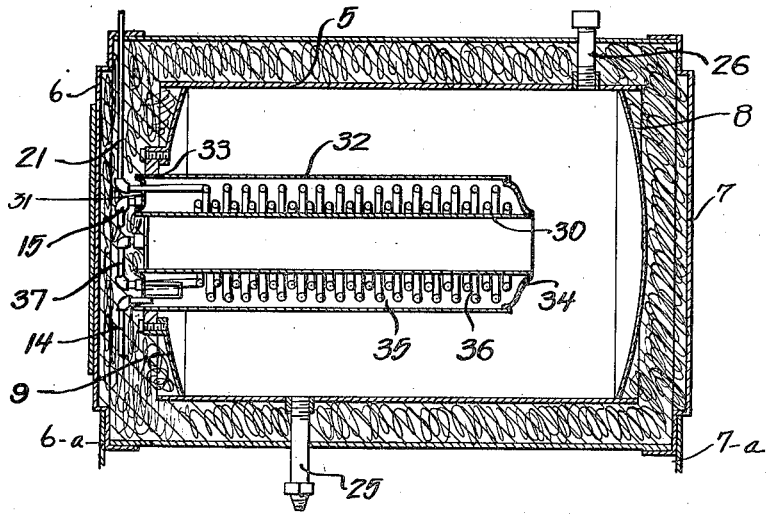
Fig. 5 is a view in longitudinal central section showing another form of cooler embodying the present invention.

Referring to the form of device shown in Fig. 5 of the drawings, where a high back pressure device is shown, it will be seen that the same general principle as shown in Figs. 1 to 4, inclusive, has been employed. In this case the liquid to be cooled is circulated in a compartment providing a passageway for a refrigerant, and then the liquid is led into the storage compartment of tank 5. In this case a central tubular member 30 is fixed to the head 9 of the tank 5 and extends into the storage compartment thereof. The outer end of the member 30 is closed by a wall 31; the inner end is open to the storage tank. Disposed in spaced circumscribing relation to the tubular member 30 is a cylindrical shell 32, closed at its outer end by a wall 33 and at its inner by a wall 34. The closed space occurring between the members 30 and 32 form an annular refrigerant compartment 35. A refrigerant inlet pipe 14 connects with this compartment as well as an outlet pipe 15. Disposed within this space is a coil of pipe 36 through which water to be cooled is passed from the supply pipe 21. The opposite end of this coil introduces the water into member 30 through pipe 37, after which the water flows into the storage tank and around to the outlet pipe 25.

Figure 6:
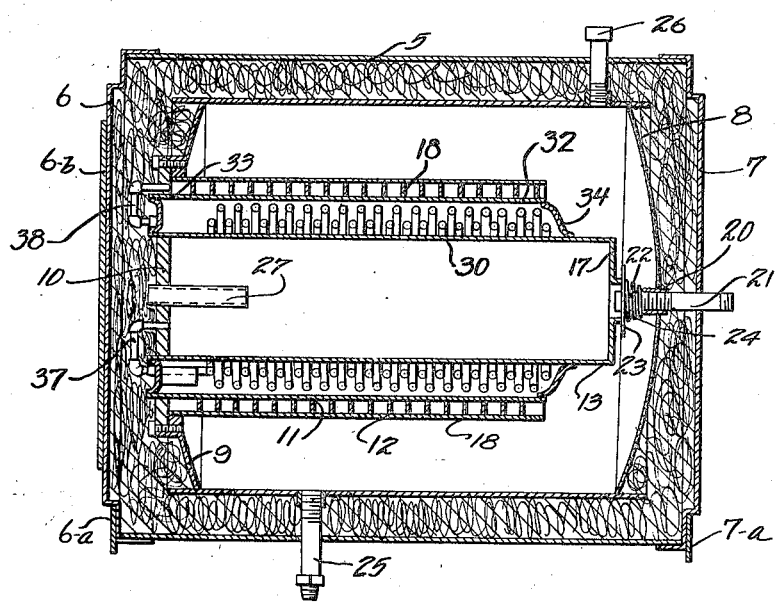
Fig. 6 is a view in central longitudinal section showing a compound cooler structure.

In the form of the invention shown in Fig. 6 both devices of Figs. 1 and 5 are embodied within a single structure. In this case the tubular member 30 is closed at its free end with the ported head 17. The relief valve 23 is provided and water is delivered through pipe 21. Circumscribing the shell 32 there is disposed the helical fin 18 which is enclosed by the outer sleeve 19. The direction of flow of liquid in this case is, however, reversed from that shown in Fig. 5 of the drawings. In this case pipe 37 connects the coil 36 with the interior of member 30. The opposite end of coil 36 connects through a pipe 38 with the end of the helical passageway defined by fin 18 between sleeves 32 and 18. The water then passes into the storage compartment of tank 5. Since the coil 36 may have more than one course of convolution, it will be seen that the liquid to be cooled will pass in heat exchange relationship to the refrigerant several times in the course of its travel to the storage compartment.

It will thus be seen that fundamentally all of the forms of the invention shown in the case are concerned with a tank within which a relatively large volume of water is disposed and which water passes along circuitous path of travel in heat exchange relationship to a refrigerant while submerged within the liquid of the storage tank and in a manner to insure that relatively large volumes of water may be rapidly cooled and may be withdrawn from the tank as demanded by ordinary domestic requirements. It will further be evident that the structure here disclosed is simple as to the formation and assembly of its parts, and that it will operate continuously and automatically without possibility of clogging due to freezing of the liquid, and, therefore, without possibility of throwing undue expansion strains on any of the parts.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. A liquid cooler comprising a storage compartment of relatively large size, a cooling unit therein submerged within the liquid being cooled, comprising a center passageway, an annular refrigerant compartment circumscribing the same, means for conducting liquid along a path in heat exchange relationship to the refrigerant compartment, and means for creating a flow of liquid through the central passageway and the heat exchange passageway to be discharged thereafter into the storage compartment.

2. A liquid cooler comprising a storage tank, a tubular shell extending thereinto and submerged within the liquid with which the tank is filled, a liquid supply pipe introducing liquid into one end of said shell, a refrigerant compartment circumscribing the shell within the storage tank, a circuitous conduit circumscribing the shell and through which liquid may flow from the shell to a storage compartment within which it is submerged.

3. A liquid cooler comprising a storage tank, a tubular shell extending thereinto and submerged within the liquid with which the tank is filled, a liquid supply pipe introducing liquid into one end of said shell, a refrigerant compartment circumscribing the shell within the storage tank, a circuitous conduit circumscribing the shell and through which liquid may flow from the shell to a storage compartment within which it is submerged, and valve means adapted to be opened when the back pressure of liquid within the shell or conduit is excessive, whereby said liquid may discharge directly into the storage tank.

4. In a liquid cooler a storage tank open at one end having an outlet for cooled liquid, a detachable head for the open end of said tank, a cooling and circulating unit for liquid carried by said head and adapted to be immersed within the cooled liquid in the storage chamber of said tank; said unit comprising spaced inner and outer casings forming an annular refrigerant chamber closed at the ends, said casings being spaced from said head and the inner casing projecting beyond said outer casing at the other end, there being an inlet and an outlet for refrigerant communicating with said refrigerant chamber, a tube extending into the bore of said inner casing through said head to form a thermal well, a spiral fin on the exterior of the outer casing, a sleeve mounted over said fin and joined to said head to provide a spiral way for liquid communicating at one end with the bore of said inner casing and at the other end with said storage chamber, said inner casing having a ported head at its free end, a tubular stem extending through said tank and communicating with said bore for the admission of liquid to be cooled, a valve disk guided on said stem and seating over the port in said ported head to prevent retrograde flow of cooled liquid from said storage chamber into said bore, and a spring tending to hold said disk seated.

5. In a liquid cooler, a storage tank open at one end and having an outlet for cooled liquid, a detachable head for the open end of said tank, a cooling and circulating unit for liquid carried by said head and adapted to be immersed within the cooled liquid in the storage chamber of said tank; said unit comprising spaced inner and outer casings forming an annular refrigerant chamber closed at the ends, said inner casing projecting beyond said outer casing at the other end, there being an inlet and an outlet for refrigerant communicating with said refrigerant chamber, a spiral fin on the exterior of the outer casing, a sleeve mounted over said fin and joined to said head to provide a spiral way for liquid communicating with the bore of said inner casing adjacent said head and at the other end with said storage chamber, said inner casing having a ported head at its free end, a tubular stem extending through said tank and communicating with said bore for the admission of liquid to be cooled, a valve disk guided on said stem and seating over the port in said ported head to prevent flow of cooled liquid from said storage chamber into said bore, and a spring tending to hold said disk seated.

6. In a liquid cooler, a storage tank having an outlet for cooled liquid, a cooling and circulating unit for liquid mounted on a head of said tank and adapted to be immersed within the cooled liquid in the storage chamber of said tank; said unit comprising spaced inner and outer casings forming an annular refrigerant chamber closed at the ends, said casings being spaced from said head and the inner casings projecting beyond said outer casing at the other end, there being an inlet and an outlet for refrigerant communicating with said refrigerant chamber, a tortuous channel formed on the exterior of the outer casing, a sleeve mounted over said outer casing and joined to said head to provide a confined tortuous way for liquid communicating at one end with the bore of said inner casing and at the other end with said storage chamber, said inner casing having a ported head at its free end, a tubular stem extending through said tank and communicating with said bore for the admission of liquid to be cooled, a valve disk guided on said stem and seating over the port in said ported head to prevent flow of cooled liquid from said storage chamber into said bore, and a spring tending to hold said disk seated.

7. In a liquid cooler, a storage tank having an outlet for cooled liquid, a cooling and circulating unit for liquid carried mounted on a head of said tank and adapted to be immersed within the cooled liquid in the storage chamber of said tank; said unit comprising spaced inner and outer casings forming an annular refrigerant chamber closed at the ends, said inner casing projecting beyond said outer casing at the other end, there being an inlet and an outlet for refrigerant communicating with said refrigerant chamber, a confined tortuous way on the exterior of the outer casing for liquid communicating at one end with the bore of said inner casing and at the other end with said storage chamber, said inner casing having a ported head at its free end, a tubular stem extending through said tank and communicating with said bore for the admission of liquid to be cooled, a valve disk guided on said stem and seating over the port in said ported head to prevent flow of cooled liquid from said storage chamber into said bore, and a spring tending to hold said disk seated.

8. In a liquid cooler, a storage tank open at one end and having an outlet for cooled liquid, a detachable head for the open end of said tank, a cooling and circulating unit for liquid carried by said head and adapted to be immersed within the cooled liquid in the storage chamber of said tank; said unit comprising spaced inner and outer casings forming an annular refrigerant chamber closed at the ends, said casings being spaced from said head, there being an inlet and an outlet for refrigerant communicating with said refrigerant chamber, a tube extending into the bore of said inner casing through said head to form a thermal well, a spiral fin on the exterior of the outer casing, a sleeve mounted over said fin and joined to said head to provide a spiral way for liquid communicating at one end with the bore of said inner casing and at the other end with said storage chamber, said casing having a ported head at its free end, a tubular stem extending through said tank and communicating with said bore for the admission of liquid to be cooled, a valve disk guided on said stem and seating over the port in said ported head to prevent flow of cooled liquid from said storage chamber into said bore, and a spring tending to hold said disk seated.

9. In a liquid cooler, a storage tank open at one end and having an outlet for cooled liquid, a detachable head for the open end of said tank, a cooling and circulating unit for liquid carried by said head and adapted to be immersed within the cooled liquid in the storage chamber of said tank; said unit comprising spaced inner and outer casings forming an annular refrigerant chamber closed at the ends, there being an inlet and an outlet for refrigerant communicating with said refrigerant chamber, a spiral fin on the exterior of the outer casing, a sleeve mounted over said fin and joined to said head to provide a spiral way for liquid communicating with the bore of said inner casing adjacent said head and at the other end with said storage chamber, said inner casing having a ported head at its free end, a tubular stem extending through said tank and communicating with said bore for the admission of liquid to be cooled, a valve disk guided on said stem and seating over the port in said ported head to prevent flow of cooled liquid from said storage chamber into said bore, and a spring tending to hold said disk seated.

10. In a liquid cooler, a storage tank having an outlet for cooled liquid, a cooling and circulating unit for liquid mounted on a head of said tank and adapted to be immersed within the cooled liquid in the storage chamber of said tank; said unit comprising spaced inner and outer casings forming an annular refrigerant chamber closed at the ends, said casings being spaced from said head, there being an inlet and an outlet for refrigerant communicating with said refrigerant chamber, a tortuous channel formed on the exterior of the outer casing, a sleeve mounted over said outer casing and joined to said head to provide a confined tortuous way for liquid communicating at one end with the bore of said inner casing having a ported head at its free end, a tubular stem extending through said tank and communicating with said bore for the admission of liquid to be cooled, a valve disk guided on said stem and seating over the port in said ported head to prevent flow of cooled liquid from said storage chamber into said bore, and a spring tending to hold said disk seated.

11. In a liquid cooler, a storage tank having an outlet for cooled liquid, a cooling and circulating unit for liquid mounted on a head of said tank and adapted to be immersed within the cooled liquid in the storage chamber of said tank; said unit comprising spaced inner and outer casings forming an annular refrigerant chamber closed at the ends, there being an inlet and an outlet for refrigerant communicating with said refrigerant chamber, a confined tortuous way on the exterior of the outer casing for liquid communicating at one end with the bore of said inner casing and at the other end with said storage chamber, said inner casing having a ported head at its free end, a tubular stem extending through said tank and communicating with said bore for the admission of liquid to be cooled, a valve disk guided on said stem and seating over the port in said ported head to prevent flow of cooled liquid from said storage chamber into said bore, and a spring tending to hold said disk seated.

12. In a liquid cooler, a storage tank open at one end and having a connection for communication with a service line, a detachable head for the open end of said tank, a cooling and circulating unit for liquid carried by said head and adapted to be immersed within the liquid in the storage chamber of said tank; said unit comprising spaced inner and outer casings forming an annular refrigerant chamber closed at the ends, said casings being spaced from said head, there being an inlet and an outlet for refrigerant communicating with said refrigerant chamber, a tube extending into the bore of said inner casing through said head to form a thermal well, a spiral fin on the exterior of the outer casing, a sleeve mounted over said fin and joined to said head to provide a spiral way for liquid communicating at one end with the bore of said inner casing and at the other end with said storage chamber, said inner casing having a closure at its free end, and a tube extending through said tank and communicating with said bore for communication with a service line.

13. In a liquid cooler, a storage tank open at one end and having a connection for communication with a service line, a detachable head for the open end of said tank, a cooling and circulating unit for liquid carried by said head and adapted to be immersed within the liquid in the storage chamber of said tank; said unit comprising spaced inner and outer casings forming an annular refrigerant chamber closed at the ends, there being an inlet and an outlet for refrigerant communicating with said refrigerant chamber, a spiral fin on the exterior of the outer casing, a sleeve mounted over said fin and joined to said head to provide a spiral way for liquid communicating with the bore of said inner casing adjacent said head and at the other end with said storage chamber, said inner casing having a closure at its free end and a tube extending through said tank and communicating with said bore for communication with a service line.

14. In a liquid cooler, a storage tank having a connection for communication with a service line, a cooling and circulating unit for liquid mounted on a head of said tank and adapted to be immersed within the liquid in the storage chamber of said tank; said unit comprising spaced inner and outer casings forming an annular refrigerant chamber closed at the ends, said casings being spaced from said head, there being an inlet and an outlet for refrigerant communicating with said refrigerant chamber, a tortuous channel formed on the exterior of the outer casing, a sleeved mounted over said outer casing and joined to said head to provide a confined tortuous way for liquid communicating at one end with the bore of said inner casing and at the other end with said storage chamber, said inner casing having a closure at its free end, and a tube extending through said tank and communicating with said bore for communication with a service line.

15. In a liquid cooler, a storage tank having a connection for communication with a service line, a cooling and circulating unit for liquid mounted on a head of said tank and adapted to be immersed within the liquid in the storage chamber of said tank; said unit comprising spaced inner and outer casings forming an annular refrigerant chamber closed at the ends, there being an inlet and an outlet for refrigerant communicating with said refrigerant chamber, a confined tortuous way on the exterior of the outer casing for liquid communicating at one end with the bore of said inner casing and at the other end with said storage chamber, said inner casing having a closure at its free end, and a tube extending through said tank and communicating with said bore for communication with a service line.

16. In a liquid cooler, a storage tank open at one end and having an outlet for cooled liquid, a detachable head for the open end of said tank, a cooling and circulating unit for liquid carried by said head and adapted to be immersed within the cooled liquid in the storage chamber of said tank; said unit comprising a casing for liquid to be cooled closed at one end and with a ported head at the other end, a confined spiral way on the exterior of said casing for liquid to be cooled, a refrigerant chamber against which the convolutions of said way lie, there being an inlet and an outlet for refrigerant communicating with said refrigerant chamber, said spiral way communicating at one end with the bore of said casing and at the other end with said storage chamber, a tubular stem extending through said tank and communicating with said bore for the admission of liquid to be cooled, a valve disk guided on said stem and seating over the port in said ported head, and a spring tending to hold said disk seated.

17. In a liquid cooler, a storage tank having an outlet for cooled liquid, a cooling and circulating unit for liquid carried by a head of said tank and adapted to be immersed within the cooled liquid in the storage of said tank; said unit comprising a casing for liquid to be cooled closed at the end adjacent said head and having a ported head at the other end, a confined spiral way on the exterior of said casing for liquid to be cooled, a refrigerant chamber against which the convolutions of said way lie, said way communicating with the bore of said casing adjacent said detachable head and at the other end with said storage chamber, a tubular stem extending through said tank and communicating with said bore for the admission of liquid to be cooled, a valve disk guided on said steam and seating over the port in said ported head and a spring tending to hold said valve disk seated.

18. In a liquid cooler, a storage tank having a connection for communication with a service line, a cooling and circulating unit for liquid mounted on a head of said tank and adapted to be immersed within the liquid in the storage chamber of said tank; said unit comprising a casing for liquid to be cooled closed at the ends, said casing being spaced from said head, a tortuous way on the exterior of said casing for liquid communicating with the bore of said casing at one end and with said storage chamber at the other end, a refrigerant chamber separated from said way by a wall along the length of said way for transfer of heat therethrough, and a tube extending through said tank and communicating with said bore for communication with a service line.

19. In combination with a source of liquid supply and a liquid withdrawal conduit, a cooler interposed between the same and in communication therewith, said cooler comprising a liquid storage tank, a cooling structure submerged within the liquid being cooled and which is contained in the tank, an annular tubular refrigerant compartment embodied within said cooling structure, and means for directing the liquid to be cooled in counterflow to the inner and outer heat exchange surfaces of said refrigerant compartment and thereafter introducing said liquid into the storage compartment.

20. In combination with a source of liquid supply and a liquid withdrawal conduit, a cooler interposed between the same and in communication therewith, said cooler comprising a liquid storage tank, a cooling structure submerged within the liquid being cooled and which is contained within the tank and through which liquid from the source of liquid supply flows into the liquid storage tank and means acting automatically to divert the flow of liquid from the cooler structure directly into the storage tank when the flow of liquid through the cooler is retarded.

21. In a liquid cooler comprising a storage tank, a tubular shell extending thereinto and submerged within the liquid with which the tank is filled, a liquid supply pipe introducing liquid into the shell, a passageway circumscribing the shell within the storage tank and through which liquid may flow from the shell through the passageway into the storage compartment within which it is submerged, means interposed between the tubular shell and the liquid supply pipe acting automatically to divert the flow of liquid from the tubular shell directly into the storage tank when the passageway becomes clogged due to ice forming therein, said diversion of liquid to the storage tank acting to liquefy the ice within the passageway to restore the flow of liquid from the supply pipe through the shell.

ROBERT O. WHITE.